(12) United States Patent
Vallur Rajendran et al.

(10) Patent No.: US 11,611,091 B2
(45) Date of Patent: Mar. 21, 2023

(54) AIR TANK AND VARIABLE GEOMETRY AIR HANDLING IN HYDROGEN FUEL CELLS

(71) Applicant: CUMMINS INC., Columbus, IN (US)

(72) Inventors: Avinash Vallur Rajendran, Indianapolis, IN (US); Vivek Anand Sujan, Columbus, IN (US); Archit N. Koti, Sunnyvale, CA (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 17/172,764

(22) Filed: Feb. 10, 2021

(65) Prior Publication Data

US 2022/0255094 A1 Aug. 11, 2022

(51) Int. Cl.
| | |
|---|---|
| H01M 8/04 | (2016.01) |
| H01M 8/04082 | (2016.01) |
| H01M 8/04111 | (2016.01) |
| H01M 8/04537 | (2016.01) |
| H01M 8/04746 | (2016.01) |

(52) U.S. Cl.
CPC .... *H01M 8/04201* (2013.01); *H01M 8/04111* (2013.01); *H01M 8/04604* (2013.01); *H01M 8/04753* (2013.01)

(58) Field of Classification Search
CPC ........... H01M 8/04201; H01M 8/0411; H01M 6/04604; H01M 8/04753
See application file for complete search history.

(56) References Cited

U.S. PATENT DOCUMENTS

| | | | |
|---|---|---|---|
| 9,343,754 B2 | 5/2016 | Inagi | |
| 9,397,361 B2 | 7/2016 | Papile | |
| 2003/0104261 A1 | 6/2003 | Schnitzer et al. | |
| 2005/0091981 A1* | 5/2005 | Saliger | H01M 8/04089 60/716 |
| 2007/0104992 A1 | 5/2007 | Tsai et al. | |
| 2013/0175972 A1 | 7/2013 | Akiyama | |

FOREIGN PATENT DOCUMENTS

| | | |
|---|---|---|
| EP | 1369950 | 10/2003 |
| KR | 100527474 | 11/2005 |

* cited by examiner

*Primary Examiner* — Olatunji A Godo
(74) *Attorney, Agent, or Firm* — Barnes & Thornburg LLP

(57) ABSTRACT

An air handling system for a fuel cell stack includes a pneumatic storage device disposed downstream from a compressor, a flow control valve system configured to operatively couple an inlet of the pneumatic storage device to an outlet of the compressor and configured to operatively couple an outlet of the pneumatic storage device to an inlet of the fuel cell stack, and a controller configured to, in response to a power demand being greater than a threshold, cause the flow control valve to open to increase a flow rate of air from the pneumatic storage device to the fuel cell stack.

18 Claims, 2 Drawing Sheets

AIR TANK AND VARIABLE GEOMETRY AIR HANDLING IN HYDROGEN FUEL CELLS

TECHNICAL FIELD

The present disclosure generally relates to systems and methods for operating a hydrogen fuel cell system.

BACKGROUND

Fuel cell systems, such as vehicles, use hydrogen or hydrogen-rich gas to power an electric motor. The fuel cell stack may generate electricity in the form of direct current (DC) from electro-chemical reactions that take place in the fuel cells. A fuel processor converts fuel into a form usable by the fuel cell. If the system is powered by a hydrogen-rich, conventional fuel, such as methanol, gasoline, diesel, or gasified coal, a reformer may convert hydrocarbons into a gas mixture of hydrogen and carbon compounds, or reformate. The reformate may then be converted to carbon dioxide, purified and recirculated back into the fuel cell stack.

SUMMARY

An air handling system for a fuel cell stack includes a pneumatic storage device disposed downstream from a compressor, a flow control valve system configured to operatively couple an inlet of the pneumatic storage device to an outlet of the compressor and configured to operatively couple an outlet of the pneumatic storage device to an inlet of the fuel cell stack, and a controller configured to, in response to a power demand being greater than a threshold, cause the flow control valve to open to increase a flow rate of air from the pneumatic storage device to the fuel cell stack.

A method for operating an air handling system of a fuel cell stack includes, in response to a power demand being greater than a threshold, controlling a flow control valve to increase a flow rate of air from a pneumatic storage device to the fuel cell stack.

An air handling system for a fuel cell stack includes a turbine configured to recover energy from exhaust air output by the fuel cell stack, a compressor disposed downstream from the turbine and configured to supply a first volume of air to the fuel cell stack, a pneumatic storage device upstream of the fuel cell stack, and a controller configured to, in response to a change in a power demand being greater than a threshold power demand, supply a second volume of air to the fuel cell stack from the pneumatic storage device, wherein the energy recovered from the turbine is supplied to at least one of the turbine or the controller.

BRIEF DESCRIPTION OF THE DRAWINGS

The detailed description particularly refers to the following figures, in which.

DETAILED DESCRIPTION

Figure 1:
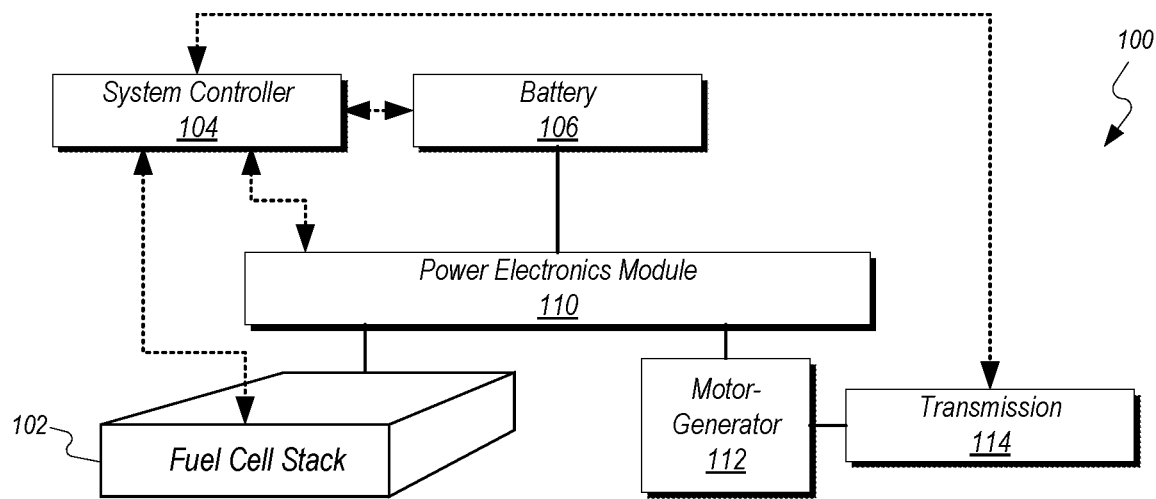
FIG. 1 is a block diagram illustrating an example fuel cell system.

While the concepts of the present disclosure are susceptible to various modifications and alternative forms, specific exemplary embodiments are been shown by way of example in the drawings and will be described. It should be understood, however, that there is no intent to limit the concepts of the present disclosure to the particular forms disclosed; on the contrary, the intention is to cover all modifications, equivalents, and alternatives falling within the spirit and scope of the invention as defined by the appended claims.

References in the specification to "one embodiment," "an embodiment," "an illustrative embodiment," etc., indicate that the described embodiment may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A fuel cell is an electrochemical device that facilitates harnessing electrical energy produced by a chemical reaction expressed using Equation (1) such that:

$$H_2 + \tfrac{1}{2}O_2 \rightarrow H_2O + 1e^- \qquad (1)$$

For the above reaction to take place, effective area of a single fuel cell (e.g., a cell) may be 1 cm$^2$ and each cell may produce a predefined amount of voltage, e.g., 2.2 Volts (V). The current produced by a cell is directly proportional to its effective surface area. Fuel cells may be connected together to form a fuel cell stack (e.g., stack assembly) that yields predefined levels of current and voltage.

To enable a continuous production of energy, a constant stream of oxygen and hydrogen need to be passed through the cell. Ideally, pure oxygen and hydrogen should be used as reactants. However, in the interest of operating economy, some systems or vehicles only store hydrogen on-board and use ambient air as a source of oxygen.

Hydrogen is typically stored at very high pressure, e.g., 300-700 bar, in a specialized tank. The fuel cell stack assembly may be configured to operate within a predefined temperature range, e.g., 60-80° C. (degrees Celsius). In some instances, performance of the fuel cell stack assembly may deteriorate at higher operating temperatures, such as when temperature of the fuel cell stack is greater than, for example, 90° C. Fuel cells use oxygen from the ambient air as an oxidizing agent to convert chemical energy stored in a fuel storage tank into another form.

Fuel cells may exhibit a time delay (e.g., transient lag) in meeting a desired power demand value. In some instances, very fast transients (e.g., 150 kW/s in a 90-kW system) are more damaging to fuel cells and advanced techniques may be necessary to limit the exposure of the fuel cells to transients. Durability of fuel cells may be affected by the number of times the fuel cells undergo a startup process. Accordingly, fuel cells may be used as steady state energy production devices and may be coupled with batteries configured to handle the transient loads. Slow transient operations also lead to the need for larger and more expensive battery systems to ensure satisfactory battery life.

Controlling more accurately the pressure of air or oxidant introduced into the air tank minimizes flow/pressure transients, thereby, improving stack durability and reduces a time lag in air delivery to the stack shortening power ramp-up rate of the fuel cell stack. In some examples, the time lag in air delivery to the stack may be shortened from three seconds or more to one second or less. Additionally or alternatively, optimizing tank pressure may modulate auxiliary load when power demand is below a predefined threshold avoiding unnecessary power down events.

In one example, a pressurized air storage device, such as an air tank, disposed downstream from a compressor of the air handling system may quickly (e.g., one second or less) deliver flow of air to the fuel cell stack, thereby, decreasing or eliminating a time lag between the delivery of fuel and the delivery of air to the fuel cell stack. As another example, positioning one or more pressurized air storage devices downstream from the compressor enables delivery of air to the fuel cell stack when the compressor is not operating, such as during shut down events due to power drawn from the fuel cell stack being less than a predefined threshold. Each pressurized air storage device may be filled by the compressor via one or more flow control valves. As still another example, a variable geometry turbine, e.g., instead of a fixed geometry turbine, disposed at (or proximate) the outlet of the fuel cell stack may permit initiating turbine operation using the flow of air from the pressurized air storage device. Accordingly, implementation of the air storage device and/or the variable geometry turbine within a given fuel cell system may enable achieving smoother flow and back pressure control.

FIG. 1 illustrates an example fuel cell system 100 including a fuel cell stack 102, a power electronic controller 104 (e.g., system controller), a battery 106, a power electronics module 110, a motor-generator 112, and a transmission 114 (although, one or more of these various components such as power electronics controllers 104 can be utilized in the system 100). The controller 104 monitors and controls operation of the fuel cell stack 102 and its various supporting subsystems. The power electronics module 110 includes one or more DC-DC converters configured to electrically isolate operating voltage supplied to the fuel cell stack 102 from the battery 106 and bus voltage. The power electronics module 110 includes an inverter and is configured to transfer power between the battery 106 and the electric motor-generator 112 connected to the transmission 114.

The fuel cell stack 102 includes a plurality of cells (e.g., fuel cells) within which an electro-chemical reaction takes place to generate electric current. Fuel, such as hydrogen or a hydrocarbon, is channeled through field flow plates to the anode on one side of the fuel cell, while oxygen from the air is channeled to the cathode on the other side of the cell. At the anode, a catalyst, such as a platinum catalyst, causes the hydrogen to split into positive hydrogen ions (protons) and negatively charged electrons. The polymer electrolyte membrane (PEM) permits the positively charged ions to flow through the PEM to the cathode. The negatively charged electrons are directed along an external loop to the cathode, creating an electrical circuit (electrical current). At the cathode, the electrons and positively charged hydrogen ions combine with oxygen to form water, which flows out of the fuel cell.

Generally, the amount of power produced by each fuel cell of the fuel cell stack 102 at least partly depends on the amounts of reactants passing through the fuel cell. As described in reference to at least FIG. 2, the fuel handling and delivery loop operates under a relatively constant pressure (e.g., fluctuation within 1 bar of a predefined pressure value), which ensures that the fuel is delivered to the fuel cell nearly instantaneously following an increase in demanded power. An air handling system of the fuel cell vehicle, system or device pressures may fluctuate more significantly (e.g., fluctuation of more than 1 bar, fluctuation of 2 bar or more, fluctuation of 3 bar or more, and so on) during normal operation, as such the flow of air required for meeting a given power demand or a change in a power demand may be unavailable or may be delivered to the fuel cell after a delay. Moreover, since ambient air contains only about one-fifth (or 20%) oxygen by volume, the amount of air that needs to be circulated through the system is at least two times the amount of hydrogen. Accordingly, the delivery of a sufficient amount of air to the fuel cell 102 may be slower, than the delivery of fuel, causing a delay in power generation. Such delayed production of power causes high current draw on the battery 106, thereby, negatively impacting battery 106 longevity.

Moreover, during any delay in power production, hydrogen being passed through the system is ultimately wasted. An increased power demand that is unmet, even for a short period of time, causes a pressure imbalance between anode and cathode plates bringing about airflow transients that degrade operation of the fuel cell. As one example, the membrane of the PEM fuel cell is particularly vulnerable to transients resulting from flow and pressure fluctuations. Such transients may damage or otherwise shorten a useful life span of the membrane.

Figure 2:
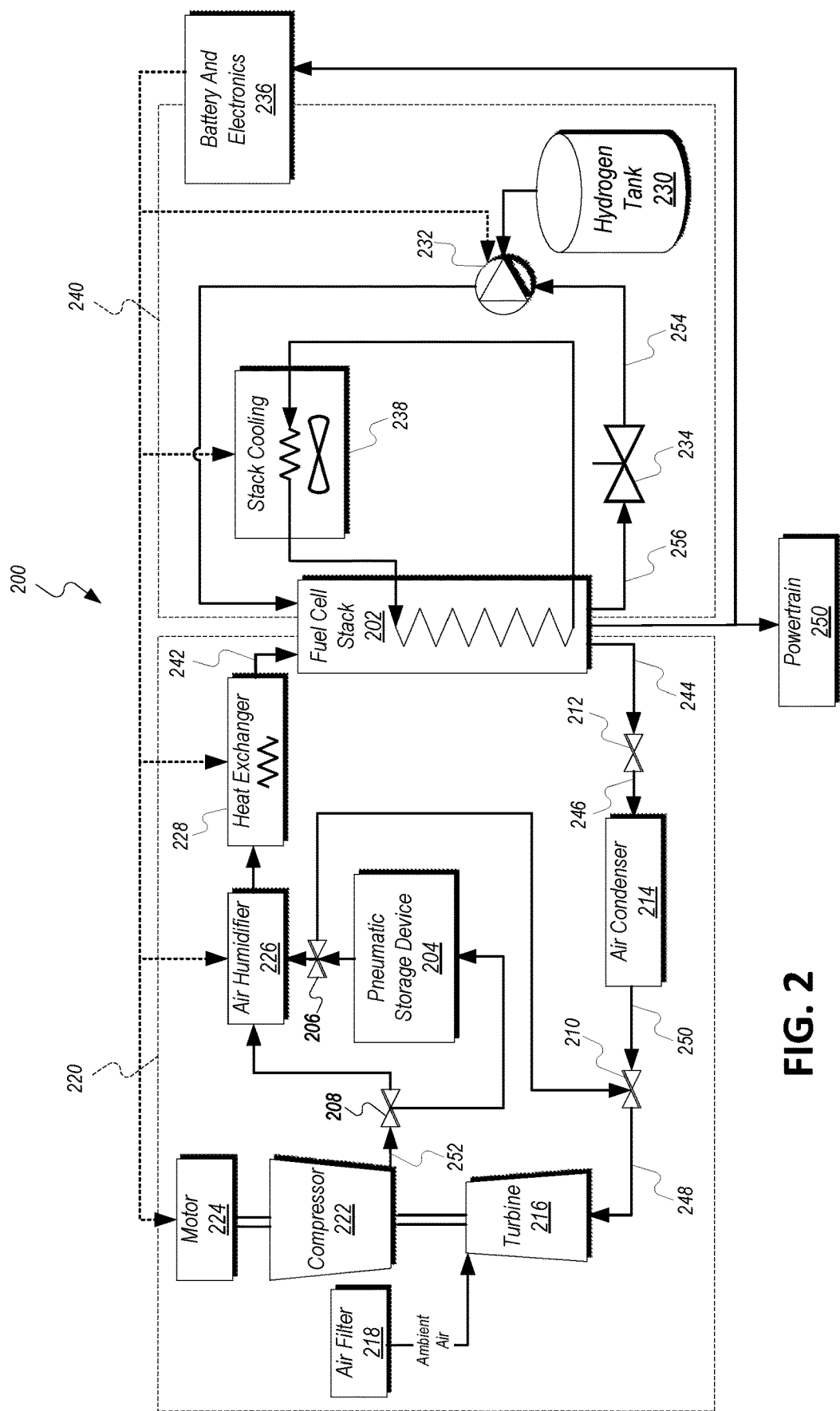
FIG. 2 is a block diagram illustrating an example air handling system of the fuel cell system of FIG. 1.

FIG. 2 illustrates an example fuel cell power system 200 including an air handling system 220 configured to provide improved conditioning of air and minimize pressure fluctuations at an inlet 242 of the fuel cell stack 202. In particular, the air handling system 220 includes a pneumatic storage device 204, such as an air tank, and a plurality of flow control valves 206, 208, 210.

The air handling system 220 supplies regulated air to the fuel cell stack 202 to feed the power generation reaction. Ambient air entering the air handling system 220 may pass through an air filter 218 before entering a compressor 222. A motor 224 controls the speed of the compressor 222 to both increase the air pressure and set the air flow rate. A controller, such as the system controller 104, can control operation of the motor 224. The cooled air output by the compressor 222 passes through an air humidifier 226 configured to saturate the air flow with water at the operating temperature of the stack 202, which can be monitored and controlled such as through a controller. A heat exchanger 228 receives the saturated air output by the air humidifier 226.

The pneumatic storage device 204 is configured to ensure that a steady stream of fresh air is available during increased power demands. In one example, in response to power demand value being greater than a predefined threshold, the pneumatic storage device 204 may be configured to supply a flow of air into the air handling system 220 of the fuel cell system 200. As another example, the pneumatic storage device 204 may be configured to supply a flow of air into the fuel cell stack 202 in response to a change in power demand value being greater than a predefined threshold. In still another example, the pneumatic storage device 204 may be configured to provide a flow of air into the air handling system 220 in response to some combination of a power demand value and a threshold change in a power demand value.

The pneumatic storage device 204 may be operably coupled to the air humidifier 226 via a first flow control valve 206. The pressurized air in the device 204 can be used as source of fresh air to begin power production. In one example, the pneumatic storage device 204 may be configured to direct a flow of air into the aid humidifier 226 when the first flow control valve 206 is open and prevent a flow of air into the aid humidifier 226, from the pneumatic storage device 204, when the first flow control valve 206 is closed. In one example, operation of the first flow control valve 206 may be monitored and controlled by the system controller 104 of FIG. 1. The pneumatic storage device 204 may be filled via a second flow control valve 208 that operatively connects the storage device 204 to a line at an outlet 252 of the compressor 222. As such, an onboard air storage device, such as the pneumatic storage device 204, ensures availability of a larger amount of air within a given time period to minimize delays in achieving an effective electro-chemical reaction. In a manner similar to that described above for the first flow control valve 206, the system controller 104 may be configured to monitor and control operation of the second flow control valve 208 and/or any other control valve disclosed herein.

Moreover, to prevent the fuel cell stack 202 from shutting down in response to power drawn being less than a predefined amount, which impacts durability and useful life of the fuel cell stack 202, the compressor 222 may be configured to act as an auxiliary load to charge the pneumatic storage device 204. Thus, the storage device and compressor are configurable to prevent fuel cell shut down in response to certain operating conditions. When the fuel cell stack 202 is turned off, pressurized flow from pneumatic storage device 204 may be used to initiate the delivery of air into the fuel cell stack 202, thereby, jumpstarting power production reaction, without having to turn on the compressor 222.

An air condenser 214 and a turbine 216 handle the exhaust air stream exiting the fuel cell stack 202. A pressure control valve 212 operatively connecting an outlet 244 of the fuel cell stack 202 to an inlet 246 to the air condenser 214 operates to remove water and water vapor from the exhaust air output by the cathode of the fuel cell stack 202. The air condenser 214 cools the exhaust air stream, at which point the air stream enters an inlet 248 of the turbine 216. The turbine 216 converts the thermal and flow (pressure) energy of the air stream coming from the fuel cell stack 202 into mechanical energy. This recovered mechanical energy may assist an electric machine, such as the motor 224, in running the compressor 222. Air exiting the turbine 216 is released into the atmosphere.

In an example, the pneumatic storage device 204 may be operably coupled to a line extending between an outlet 250 of the air condenser 214 and the inlet 248 of the turbine 216 via a third flow control valve 210. In a manner similar to that of the first flow control valve 206, the pneumatic storage device 204 may be configured to direct a flow of air into the line downstream of the outlet 250 of the air condenser 214 when the third flow control valve 210 is open and prevent a flow of air into the line at the outlet 250 of the air condenser 214, from the pneumatic storage device 204, when the third flow control valve 210 is closed. Other methods for operating the third flow control valve 210 are also contemplated. In an example, the third flow control valve 210 may be configured to permit the flow of air from the pneumatic storage device 204 while preventing the flow of air from the air condenser 214.

In some instances, such as during startup events, the pneumatic device 204 may be configured to direct the flow of air into the turbine 216, such as through the third flow control valve 210. In some instances, the fuel cell system 100, 200 may be equipped with a variable geometry turbine such that the flow of air from the pneumatic device 204 causes torque to be applied onto the compressor 222, thereby initiating delivery of fresh air to the cathode of one or more fuel cells of the fuel cell stack 202. This approach causes a presence of hot air at an inlet 242 to the cathode side of the fuel cell stack 202, thereby aiding during cold start and warmup events. Geometry of the variable geometry turbine may be adapted in accordance to operating conditions to modulate compressor speed, load and/or pressure ratio between the air handling system and the atmosphere. Moreover, for fuel cell systems that operate at higher pressures, a turbine may be coupled directly to the outlet of the cathode to increase an amount of energy recovered from the cathode exhaust gas.

Accordingly, the air handling system 220 of the present disclosure minimizes a delay in delivering oxygen necessary for the power producing reaction to take place. The air handling system 220 is configured to ensure a steady and constant availability of oxygen to each fuel cell of the fuel cell stack 202, thereby, minimizing the transients and increase operating life of the fuel cell(s) and the fuel cell stack 202.

A fuel handling system 240 of the fuel cell power system 200 includes one or more hydrogen storage tanks 230. A recirculation pump 232 is configured to selectively draw at least a portion of the hydrogen fuel from the one or more hydrogen storage tanks 230 and direct the portion of hydrogen toward the anode side of the fuel cell stack 202. An electrically and/or mechanically controlled pressure valve 234 disposed between an inlet 254 of the recirculation pump 232 and an outlet 256 of the anode of the fuel cell stack 202 may be configured to selectively relieve pressure by releasing excess hydrogen within the fuel recirculation loop. At least a portion of anode exhaust gases at the outlet 256 of the anode of the fuel cell stack 202 may be directed to the recirculation pump 232 where the exhaust gas may be mixed with hydrogen fuel from the storage tanks 230.

A reaction that combines hydrogen and oxygen to produce water and electricity is an exothermic reaction and generates heat. A thermal system including stack cooling 238 of the fuel cell vehicle is configured to reject the heat and maintain operating temperature of the fuel cell stack 202 within a predefined threshold or temperature range.

The fuel cell stack 202 generates energy (e.g., electric power) to power a powertrain 250, which can be integrated with the fuel cell system 200 or a separate system of the vehicle. The powertrain 250 may include one or more of a drive motor, e.g., the motor-generator 112, a transmission, e.g., the transmission 114, and/or one or more ancillary components. The fuel cell stack 202 energy may be used to maintain charge of an auxiliary vehicle battery of a battery and electronics 236, e.g., a low voltage battery supplying power to one or more components or devices connected to a low voltage bus. The auxiliary vehicle battery of the battery and electronics system 236 may operate in a manner similar to that of the battery 106 described in reference to FIG. 1. Additionally or alternatively, at least a portion of the power generated by the fuel cell stack 202 may be transferred directly to a plurality of electronic devices onboard the fuel cell vehicle, such as, but not limited to, one or more electronic controllers or devices configured to condition output power of the fuel cell stack 202, e.g., one or more components of the power electronics module 110 described in reference to FIG. 1, one or more system controllers, e.g., system controller 104 of FIG. 1, one or more controllers or other components of a steering system, propulsion components cooling system and interior cabin heating ventilation and A/C (HVAC) system, and so on.

Figure 3:
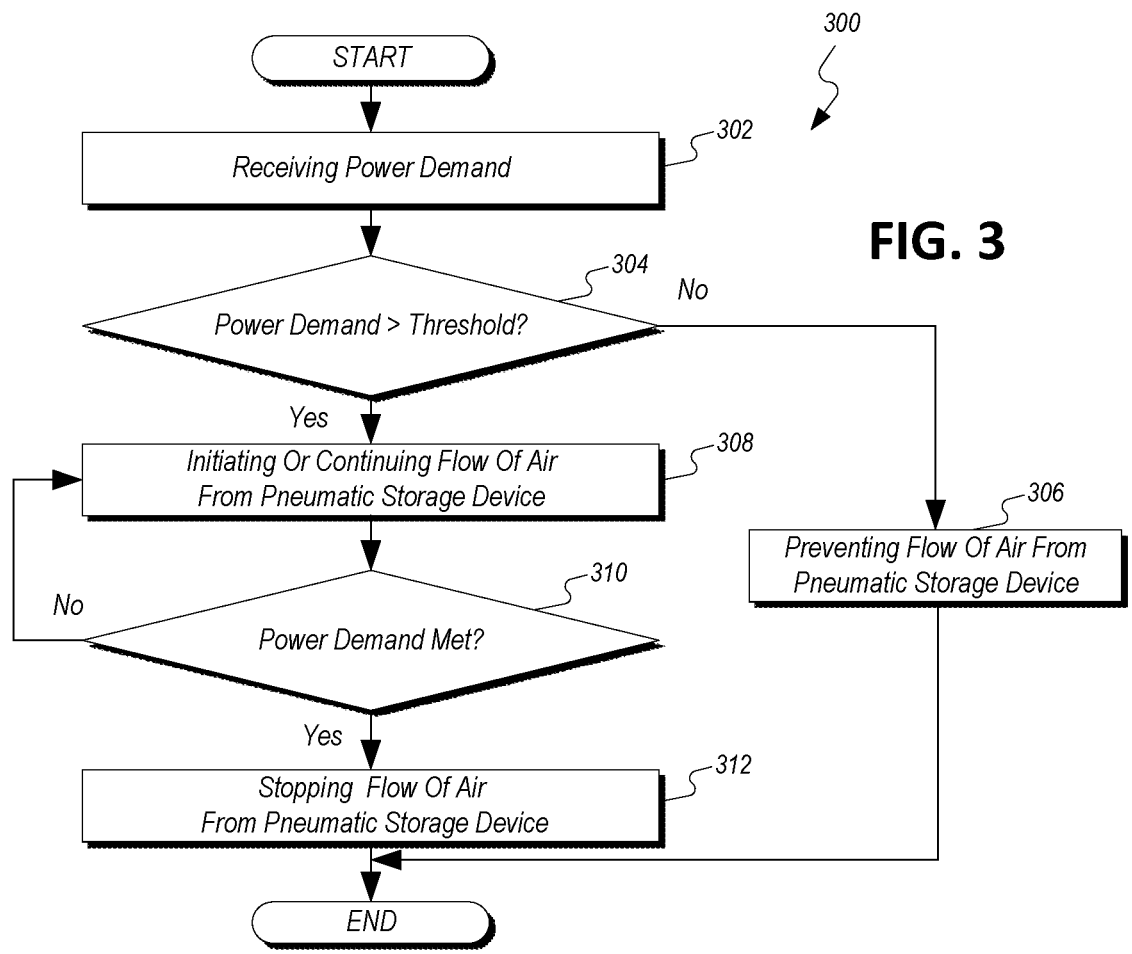
FIG. 3 is a block diagram illustrating an example process flow for operating the air handling system of FIG. 2.

FIG. 3 illustrates an example process flow 300 for operating an air handling system, such as the air handling system 200 of FIG. 2. The process 300 may be executed by one or more controllers of the fuel cell system, the vehicle, or some combination thereof. In one example, the system controller 104 executes process 300 in response to a corresponding parameter threshold being met or in response to a corresponding command. The process 300 begins at block 302 where the controller 104 receives a signal indicating a present power demand parameter value. While the process 300 describes monitoring and evaluating a power demand parameter value, in some instances, the controller 104 may receive a signal indicating a value of a different parameter, such as a change in power demand parameter value.

At block 304, the controller 104 determines whether a received power demand value is greater than a predefined threshold. In response to the received power demand value being less than a predefined threshold, a controller such as the controller 104, at block 306, prevents flow of air from the pneumatic storage device 204 into the fuel cell system 200. The controller 104 may then end or exit the process 300.

In response to power demand value and/or a change in power demand value being greater than a predefined threshold, a controller such as the controller 104, at block 308, initiates (or continues) a flow of air from the pneumatic storage device 204. At block 310, the controller 104 determines whether a requested power demand has been met. The controller 104 returns to block 308 where it continues to cause a flow of air from the pneumatic storage device 204, in response to the power demand not being met. At block 312 the controller 104, in response to the power demand being met, stops the flow of air from the pneumatic storage device 204 into the fuel cell system 200.

The presence of reserve pressurized air, in accordance with the present disclosure, enables the air handling system to respond quicker to sudden increase in air demand to thereby improve the system's transient performance. Intelligent actuation of output from the tank can selectively increase a pressure level in the air handling system to a desired pressure level and/or maintain a pressure level in the air handling system at a predefined desirable pressure level, which will minimize flow transients and improve durability of the fuel cell stack. Intelligent actuation of output from the tank enables the fuel cell to respond quicker (e.g., within 3-6 seconds from zero power to maximum power value) to an increase in power demand, thereby improving transient power response and shortening a time period to achieve peak power.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. An air handling system for a fuel cell stack, the system comprising:
   a compressor;
   a pneumatic storage device disposed downstream from the compressor;
   a variable geometry turbine operatively coupled to the compressor and configured to recover energy from a direct air stream exhausted from the fuel cell stack;
   a flow control valve system configured to operatively couple an inlet of the pneumatic storage device to an outlet of the compressor and configured to operatively couple an outlet of the pneumatic storage device to an inlet of the fuel cell stack; and
   a controller configured to, in response to a power demand being greater than a threshold, cause the flow control valve to open to increase a flow rate of air from the pneumatic storage device to the fuel cell stack.

2. The system of claim 1, wherein the flow control valve system comprises:
   a first flow control valve disposed in a first line operatively coupling the outlet of the pneumatic storage device and the inlet of the fuel cell stack; and
   a second flow control valve disposed in a second line operatively coupling the outlet of the compressor to the inlet of the pneumatic storage device.

3. The system of claim 2, wherein the controller is configured to selectively control the second flow control valve to supply a volume of air to the pneumatic storage device independently of the first flow control valve.

4. The system of claim 2, wherein the variable geometry turbine is configured to modulate at least one of an operating speed of the compressor, a power drawn from the fuel cell stack, or a pressure ratio.

5. The system of claim 2, further comprising a third flow control valve configured to operatively couple the pneumatic storage device to an inlet to the turbine, wherein the controller is configured to selectively cause the third flow control valve to open to increase a flow rate of air from the pneumatic storage device into the inlet to the turbine, such that torque is applied onto the compressor and a flow of air is delivered to the fuel cell stack.

6. A method for operating an air handling system of a fuel cell stack, the method comprising:
   in response to a power demand being greater than a threshold, controlling a flow control valve to increase a flow rate of air from a pneumatic storage device to the fuel cell stack: and
   recovering energy from a direct air stream exhausted from the fuel cell stack through a variable geometry turbine to increase pressure in the air handling system.

7. The method of claim 6, wherein the flow control valve is a first flow control valve, and further comprising a second flow control valve that is configured to operatively couple an outlet of a compressor to the pneumatic storage device.

8. The method of claim 7, further comprising selectively controlling the second flow control valve to supply a volume of air to the pneumatic storage device.

9. The method of claim 7, further comprising modulating at least one of an operating speed of the compressor, a power drawn from the fuel cell stack, or a pressure ratio.

10. The method of claim 7, further comprising selectively causing a third flow control valve to open to increase a flow rate of air from the pneumatic storage device into an inlet to a turbine, such that torque is applied onto the compressor and a flow of air is delivered to the fuel cell stack.

11. An air handling system for a fuel cell stack, the system comprising:
   a variable geometry turbine operatively coupled to the compressor and configured to recover energy from a direct exhaust air output by the fuel cell stack;
   a compressor disposed downstream from the turbine and configured to supply a first volume of air to the fuel cell stack;
   a pneumatic storage device upstream of the fuel cell stack; and
   a controller configured to, in response to a change in a power demand being greater than a threshold power demand, supply a second volume of air to the fuel cell stack from the pneumatic storage device,
   wherein the energy recovered from the turbine is supplied to at least one of the turbine or the controller.

12. The system of claim 11, wherein the compressor is configured to selectively supply a third volume of air to the pneumatic storage device.

13. The system of claim 11, wherein the first and second volumes of air are mixed upstream of the fuel cell stack.

14. The system of claim 11, wherein the controller stops operation of the compressor in response to the supply of the second volume of air from the pneumatic storage device to the fuel cell stack.

15. The system of claim 11, further comprising a valve that operatively couples the pneumatic storage device to an inlet of the turbine, wherein the controller controls operation of the valve to control a flow rate of air from the pneumatic storage device to the turbine.

16. The system of claim 15, wherein the variable geometry turbine is configured to modulate at least one of an operating speed of the compressor, a power drawn from the fuel cell stack, or a pressure ratio.

17. The system of claim 15, wherein the flow rate of air directed from the pneumatic storage device to the turbine causes torque to be applied onto the compressor.

18. A fuel cell system, comprising: the fuel cell stack comprising one or more fuel cells; the air handling system of claim 11; and a fuel handling system configured to supply a volume of hydrogen to the one or more fuel cells of the fuel cell stack.

* * * * *